Patented Nov. 30, 1937

2,100,781

UNITED STATES PATENT OFFICE 2,100,781

ANTISEPTIC FOR THE TREATMENT OF GENITOURINARY INFECTIONS

Raymond T. Kaupp, Portland, Oreg.

No Drawing. Application May 4, 1936,
Serial No. 77,763

7 Claims. (Cl. 167—58)

My invention has for its object the providing of a chemical compound having greater efficiency for the treatment of genito-urinary infections, and specifically gonorrhea, than the chemicals heretofore known and applied for such cases.

My invention is the result of my discovery that in the treatment of gonorrhea a chemical possessing known bactericidal power, for example nitrate of silver, may be carried to the deeper urethral tissue by the employment of an anilin dye selected for its affinity for and capacity to stain the gonococcus organism, and the various bacteria commonly found in urethral infections.

In other words, I have discovered that certain basic anilin dyes having affinity for and capacity to stain the said bacteria. (*M. catarrhalis*; *B. coli*, diphtheroids (Hoffmanni type); Staphlococcus, aureus and albus; Pneumococcus; Diphtheroids (true); Streptococcus; Diplococcus Magnus of Rosenthal; Meinigococcus; Streptopneumococcus; *Diplobacillus-Gram positive*; *Diplobacillus-Gram negative*), either directly or as a counter stain, may be used as a "carrier", as it were, for a chemical possessing greater bactericidal power than the dye itself, said anilin dye possessing the property of forming a stable aqueous solution with said silver nitrate.

Describing more particularly the nature of my invention, it is well-known that certain dyes possess marked power of tissue penetration. My invention is based on this behavior of the dye. It is conceded that various dyes have previously been used in medicine, also that silver nitrate is a well known antiseptic which has long been in common use; but I claim as my invention the discovery of the efficacy of said two chemicals in combination, in certain definite relative proportions as hereinafter set forth, for therapeutical use in gonococcal or other infections common to the urethra. In my opinion, the success of my preparation in the treatment of gonorrhea, and other urethral infections, is due to:

(a) The marked affinity of the dye for the organisms.

(b) The marked tissue-penetration ability of the dye.

(c) The evident ability of the dye to combine, or "link" itself, with the silver nitrate in the role of a chemical "carrier" for the more potent bactericide.

I have further discovered that Pyronin, a basic red anilin dye, is especially well suited for my purpose, and when combined with nitrate of silver produces a compound especially efficient for the treatment of gonococcal infections.

By utilizing the dye as a chemical "carrier" of a standard antiseptic in weak solution, I have found that a decidedly greater penetration of the urethral mucosa occurs. In addition there is a definite chemical affinity, or specificity, of the solution combining the dye with an antiseptic for the gonococcus. These statements are based upon extensive clinical investigation in which the results obtained were superior to those claimed by prior investigators in this field.

According to my tests, the components of my antiseptic preparation and the proportions may be as follows:

Parts
A basic anilin dye selected for its affinity for and capacity to stain the bacteria of said infections_____ 2
Silver nitrate, or other soluble inorganic salt of silver_____ 1

The mixture of these two chemicals in their dry state apparently produces no chemical change; but when this chemical mixture is dissolved in the proper quantity of water, tap or distilled, a definite stable chemical combination apparently is formed. The most efficacious solution I found to be in the strength of 1 to 2750. Due to the extreme chemical complexity of all dyes, the exact nature of this chemical change is as yet obscure, but there is definite evidence that a chemical change has occurred because of the fact that when a mixture of the anilin dye and silver nitrate is placed in aqueous solution, the silver nitrate, as such, qualitatively loses its identity.

The most probable theory of this change is that of colloidal adsorption of silver ions by Pyronin particles of greater than molecular size, or even of absorption of the silver ions by the dye molecule.

The following tests made by me substantiate my conclusion that a new chemical is formed by the mixture of said dye and antiseptic dissolved in the proper quantity of water, namely:—

1. Electrolysis of a therapeutic solution of Pyronin and silver nitrate for 6 hours gave no silver precipitate on the platinum gauge electrode.

2. *Metallic copper strip test.*—Copper strips were immersed over night in the test solution (Pyronin and AgNO3) and in a control solution of silver nitrate (same strength). The control solution produced a definite darkening of the copper strips. The Pyronin-silver nitrate solution produced no perceptible discoloration of the copper, thus indicating the absorption or adsorption, of the silver ions by the dye molecule.

3. Acidification and alkalinization bring about the same color changes in a Pyronin solution and a Pyronin-silver nitrate solution. This indicates that free silver ions are not present.

The manner of use and the amount of material employed are as follows:

1. For anterior infections, acute or sub-acute, the anterior canal is simply "bathed" with the Pyronin-silver nitrate solution injected by a ¼ oz. blunt, glass-tipped bulb syringe. From a half, to the full contents, of the syringe is injected and expelled. This is repeated four or five times, a total of from 1 to 1½ oz. of the solution being used. No manual retention except for perhaps ½ minute of the final syringe full is permitted.

2. For posterior infections, acute, sub-acute, or chronic, the first syringe full is used to "flush" the anterior canal. The second syringe full is manually retained and the third syringe full is used to force gently the second syringe full into the posterior canal. A fourth and usually a fifth syringe full is subsequently used. Approximately 1½ oz. of solution is used for each posterior treatment, 1 oz. of which is retained in the posterior urethra and bladder.

A practical point to consider is that stains on the hands are removable with soap and water, laundering removes linen stains, and any commercial bleaching agent will remove stains on porcelain or plumbing.

Better than average results were also obtained by me in the treatment of gonorrhea in the female, and also in numerous cases of non-specific urethritis in the male.

The same strength of the solution has been used in all cases where it has been employed.

Pyronin is a member of the fluorescein group and is a derivative of diphenylmethane (Xanthine series) and contains the pyrone ring.

Therapeutically the following formula has been used by me with outstanding results:

Pyronin _____ grains__ 3
Silver nitrate _____ do____ 1½
Water _____ cc__ 800

The resulting solution has a strength of 1 to 2750.

4. *Pharmacology.*—The Pyronin-silver nitrate mixture is a dull red, finely crystalline powder. Freely soluble in hot or cold water in the concentration suitable for therapeutic use. Solution produces a deep red color. The pH is 6.0, slightly acid, but for practical purposes, neutral. The solution is alkaline to blue litmus. Therapeutic concentration of an aqueous solution is 1–2750. It is non-toxic, and non-irritating in therapeutic strength. The solution is stable, i. e., there was no physical change in a solution 15 months old. A solution prepared 21 months previous showed a slight precipitation, and on shaking, the precipitate went back into solution.

*Action.*—Bacteriostatic, bactericidal and stimulation of the physiological activity of the urethral cells.

*Mode of action.*—That of dissolution, or direct penetration, of the cell membrane of the organism.

I claim:

1. An antiseptic preparation for the treatment of genito-urinary infections consisting of a basic anilin dye selected for its affinity for, and capacity to stain the bacteria of said infections, and a soluble inorganic salt of silver, said ingredients being commingled in dry comminuted form in predetermined relative proportions, and forming with water a stable aqueous solution of desired strength.

2. An antiseptic preparation for the treatment of genito-urinary infections consisting of a basic anilin dye selected for its affinity for, and capacity to stain the bacteria of said infections, and a soluble inorganic salt of silver, said ingredients being commingled in dry comminuted form in proportions of approximately two parts of said dye to one part of said silver salt, and forming with water a stable aqueous solution of desired strength.

3. An antiseptic preparation for the treatment of genito-urinary infections consisting of the anilin dye "pyronin" and a soluble inorganic salt of silver, said ingredients being commingled in dry comminuted form in predetermined relative proportions, and forming with water a stable aqueous solution of desired strength.

4. An antiseptic preparation for the treatment of genito-urinary infections consisting of the anilin dye "pyronin" and nitrate of silver, said ingredients being commingled in dry comminuted form in proportions of approximately two parts of said dye to one part of said silver salt, and forming with water a stable aqueous solution of desired strength.

5. An antiseptic preparation for the treatment of genito-urinary infections consisting of a basic anilin dye selected for its affinity for, and capacity to stain the bacteria of said infections, and a soluble inorganic salt of silver, said ingredients being intermixed, in predetermined relative proportions and dissolved in water to form a stable aqueous solution of desired strength.

6. An antiseptic preparation for the treatment of genito-urinary infections consisting of a basic anilin dye selected for its affinity for, and capacity to stain the bacteria of said infections, and a soluble inorganic salt of silver, said ingredients being intermixed in proportions of approximately two parts of said dye to one part of said silver salt and dissolved in water to form a stable aqueous solution of desired strength.

7. An antiseptic preparation for the treatment of genito-urinary infections consisting of the anilin dye "pyronin" in combination with nitrate of silver, said ingredients being intermixed in proportions of approximately two parts of said dye to one part of said silver salt and dissolved in water to form a solution having a strength of approximately 1–2750.

RAYMOND T. KAUPP.